United States Patent
Shimazaki

(10) Patent No.: US 7,154,633 B2
(45) Date of Patent: Dec. 26, 2006

(54) PROFILE SERVER AND PROFILE RETRIEVAL APPARATUS

(75) Inventor: Osamu Shimazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1050 days.

(21) Appl. No.: 10/115,130

(22) Filed: Apr. 4, 2002

(65) Prior Publication Data

US 2002/0191214 A1    Dec. 19, 2002

(30) Foreign Application Priority Data

Apr. 25, 2001    (JP)    ............... 2001-127172

(51) Int. Cl.
*H04N 1/46*    (2006.01)
*G06K 15/00*    (2006.01)

(52) U.S. Cl. ............... 358/1.9; 358/2.1; 358/504

(58) Field of Classification Search ............... 358/1.15, 358/1.16, 1.9, 2.1, 3.23, 504, 518
See application file for complete search history.

(56) References Cited

U.S. PATENT DOCUMENTS

H001506 H  * 12/1995  Beretta ............... 345/591
6,714,673 B1 * 3/2004  Ohta ............... 382/167

FOREIGN PATENT DOCUMENTS

JP    10-117290    5/1998
JP    02002218266    * 8/2002

* cited by examiner

*Primary Examiner*—Jerome Grant, II
(74) *Attorney, Agent, or Firm*—Sughrue Mion, PLLC

(57) ABSTRACT

A profile server provides via a communication network information to select a printing site. The profile server has a characteristics computing section for computing characteristics of a color image in the printing site in accordance with the color profile stored in a profile storage section, and an indication data creating section for creating indication data indicating the computed characteristics to supply the indication data via an Internet to a request source.

9 Claims, 2 Drawing Sheets

PROFILE SERVER AND PROFILE RETRIEVAL APPARATUS

BACKGROUND OF THE INVENTION

1. Field of the Invention

The present invention relates to a profile server for providing a color profile in accordance with a request, and a profile retrieval apparatus for retrieving a color profile.

2. Description of the Related Art

Hitherto, computerization and digitalization advance in a printing field too. For example, in the event that a printed matter of a color image is produced, image data is generated in such a matter that the color image is read by a color scanner to obtain image data (CMY data) representative of three colors of, for example, cyan (C), magenta (M), and yellow (Y), and color images represented by the obtained image data are edited on a display screen, so that image data representative of the edited color image is created. The image data thus created are created in form of image data (CMYK data) representative of four colors of, for example, cyan (C), magenta (M), yellow (Y), and black (K). Machine plates, which carry halftone dot images for those four colors, respectively, are created in accordance with the image data. The machine plates thus created are mounted on a printing machine so that the halftone dot images of CMYK four colors are printed in such a manner that those halftone dot images are superposed on one another. Thus, there is produced a printed matter of the color image consisting of those halftone dot images.

It is general that the Design Company and the publishers perform editing of the color image, and the printing company performs printing. In the event that the Design Company and the publishers are long way off from the printing company, it is the conventional way that image data is stored in MO (magneto-optical disk) and the like and is sent from the Design Company and the publishers to the printing company.

On the other hand, recently, a communication technology in a communication network represented by the Internet and the like advances and it is often performed that image data representative of an image obtained through photography by a digital still camera is transferred via the communication network. Thus, in future, there is expected a printing system in which image data for printing is transmitted and received via a communication network between a plurality of printing companies and printing offices, and the Design Companies and the publishers. The printing companies and printing offices, which join such a printing system, are referred to as a "printing site". According to such a printing system, the Design Companies and the publishers can choose various printing sites in accordance with a sort of printed matters and an area in which printed matters are distributed, and thus it is convenient.

There are various sorts in printing machines and inks used in such a plurality of printing sites. For this reason, it is known that a color of a printed matter corresponding to one CMYK data, for example, (C, M, Y, K)=(50, 50, 50, 50) varies in accordance with a machine type of a printing machine and a sot of an ink. Accordingly, in order to reproduce on a printed matter a color of a color image taken in by a certain scanner and a color of a color image edited on a certain display, it is necessary to convert the image data in accordance with a machine type of a printing machine and a sort of an ink. Such a conversion is conventionally performed when a color of an image read by a scanner is reproduced on a display. When such a conversion is performed, there is used a color profile in which an association between a color of an image (here a color of a printed matter) and image data is expressed by an LUT (Look Up Table) form.

Such a profile is utilized not only when image data is converted in the printing site and the like, but also when an original reading by a scanner and an image editing on a display are performed in the Design Company and the publishers. For this reason, it is desired for the above-mentioned printing system in which a plurality of printing sites joins that color profiles associated with the printing sites are put together and there is incorporated thereinto a profile server for providing the color profiles are provided via a communication network.

According to the printing system into which the profile server is incorporated, design companies and publishers choose a printing site to obtain a color profile of the printing site and perform original reading and image editing in accordance with the color profile. Image data representative of edited image is transferred to the printing site to print an image. Thus, it is possible to reproduce on a printed matter a color image of a color, which the design companies and the publishers wish.

By the way, in a field of printing, there is a high level of requirement for colors as compared with other fields using color images and it often happens that the design companies and the publishers pursue a subtle nuance of colors of a color image in a printed matter. On the other hand, according to the color reproduction by the color profile, it is ensured that a desired color is reproduced making no great difference, but regarding the subtle nuance of colors it is not ensured.

Thus, when design companies and publishers choose a printing site in the printing system into which the above-mentioned profile server is incorporated, it is surmised that there is needed such a complicated procedure that various color profiles associated with various printing sites are obtained, a color image on a printed matter is reproduced by a display and a printer in accordance with the various color profiles, and a desired printing site is chosen upon referring to the reproduced color image.

For this reason, it is desired that the profile server, who is incorporated into the above-mentioned printing system, has a function of providing via a communication network information to select a desired printing site. The user uses such a function to choose the printing site on the printing system.

SUMMARY OF THE INVENTION

In view of the foregoing, it is an object of the present invention to provide a profile server capable of providing via a communication network information to select a printing site, and a profile retrieval apparatus useful for selection of a printing site.

To achieve the above-mentioned object, the present invention provides a first profile server comprising:

a storage section for storing on each of a plurality of printing mechanisms a color profile representative of an association between a color of a color image on a printed matter obtained by a printing mechanism for printing the color image in accordance with image data representative of the color image and the image data;

a color profile providing section for obtaining the color profile from said storage section when the color profile is required, and providing the obtained color profile;

a characteristic amount computing section for computing characteristic amount representing with a numerical value colors of color images on printed matters obtained by printing mechanisms associated with color profiles designated more than one from among a plurality of color profiles stored in said storage section, in accordance with the designated color profiles more than one; and a characteristic amount indication data creating section for creating characteristic amount indication data indicating the characteristic amount computed by said characteristic amount computing section and providing the created characteristic amount indication data.

In the first profile server according to the present invention as mentioned above, it is characterized in that said characteristic amount computing section designates the color profiles more than one via a communication network, and said characteristic amount indication data creating section provides the characteristic amount indication data to a designation source that designates the color profiles more than one for said characteristic amount computing section.

Here, the "printing mechanism" implies a mechanism of printing a printed matter in accordance with image data. Such a "printing mechanism" is installed in for example a printing staff and a printing company. It is no matter whether the printing mechanism is connected to a communication network. The above-mentioned printing site is provided with such a printing mechanism one or more. The selection of the printing site is substantially the same as the selection of the printing mechanism.

The color profile referred to in the present invention indicates an association between a color of a color image on a printed matter and image data. Thus, in accordance with the color profile, it is possible to compute characteristic amount (for example, chromaticity values and the like) representative of a color actually obtained on the printed matter for image data (CMYK data) representative of dot % (for example, C=50%, M=40%, Y=40%, and K=0%) of the specific gray balance. The characteristic amount thus computed indicates characteristics of the color of the color image obtained on the printed matter.

According to the first profile server of the present invention, such a characteristic amount is computed by the characteristic amount computing section, so that characteristic amount indication data representative of the characteristic amount is created by the characteristic amount indication data creating section and then provided. Thus, the user, who selects a printing site, obtains the characteristic amount indication data from the characteristic amount indication data creating section, and is able to select a printing site with which a desired color of printed matter is obtained, referring to the characteristic amount represented by the characteristic amount indication data.

In the first profile server according to the present invention as mentioned above, it is preferable that said characteristic amount indication data creating section compares mutually characteristic amounts with one another computed on a plurality of color profiles and creates data indicating a result of comparison in form of the characteristic amount indication data.

It is considered that there is a case where the user, who selects a printing site, knows only a matter that a printed matter obtained by a certain specified printing site is preferable, and exclusively utilizes only the specified printing site, but does not know characteristics of the color of the color image by the specified printing site. In this case, it is considered that for example, for a reason that the specified printing site is busy, there occurs a need to seek another preferable printing site with which a preferable printed matter is obtained, other than the specified printing site. At that time, if there is obtained a result of a comparison of the specified printing site with another printing site in the characteristic amount, referring to the result makes it possible to seek a printing site with which a preferable printed matter is obtained in a similar fashion to that of the specified printing site.

In the first profile server according to the present invention as mentioned above, it is preferable that said characteristic amount indication data creating section compares the characteristic amount computed by said characteristic amount computing section with characteristic amount representative characteristics of a color of a predetermined standard color image and creates data indicating a result of comparison in form of the characteristic amount indication data.

Here, it is acceptable that the "standard color image" is a color image on a printed matter obtained by the existing printing mechanism, or alternatively a color image on an ideal fictitious printed matter.

Even in the event that the user, who selects a printing site, does not know at all a preferable printing site, if there is obtained a result of comparison of characteristic amount representative of characteristics of a color of a predetermined standard color image deemed to be a standard in the printing trade with characteristic amount in the printing mechanism of the designated printing site, referring to the result makes it possible to seek a printing site which is provided with a printing mechanism capable of obtaining a color image of a preferable color at the same degree as such a predetermined standard color image.

In the first profile server according to the present invention as mentioned above, it is acceptable that said characteristic amount indication data creating section creates data wherein the characteristic amount computed by said characteristic amount computing section is indicated in a table format, in form of the characteristic amount indication data. Or alternatively, it is acceptable that said characteristic amount indication data creating section creates data wherein the characteristic amount computed by said characteristic amount computing section is indicated in a graph format, in form of the characteristic amount indication data.

An indication of characteristic amount in a table format is convenient for all-inclusively grasping characteristics of a color of a color image, in the event that the characteristic amount includes a number of items of numeral values. On the other hand, an indication of characteristic amount in a graph format is convenient for sensuously grasping characteristics of a color of a color image.

To achieve the above-mentioned object, the present invention provides a profile retrieval apparatus comprising:

a characteristic amount computing section for computing characteristic amount representing with a numerical value colors of color images on printed matters obtained by printing mechanisms associated with color profiles each representative of an association between a color of a color image on a printed matter obtained by a printing mechanism for printing the color image in accordance with image data representative of the color image and the image data, in accordance with the color profiles stored in a storage medium storing the color profiles on a plurality of printing mechanism; and a color profile retrieval section responsive to a predetermined instruction for executing a retrieval for a color file using the characteristic amount computed by said characteristic amount computing section as a retrieval key on the color profiles stored in said storage medium.

Further, to achieve the above-mentioned object, the present invention provides a second profile server comprising:

a storage section for storing on each of a plurality of printing mechanisms a color profile representative of an association between a color of a color image on a printed matter obtained by a printing mechanism for printing the color image in accordance with image data representative of the color image and the image data;

a color profile providing section for obtaining the color profile from said storage section when the color profile is required, and providing the obtained color profile;

a characteristic amount computing section for computing characteristic amount representing with a numerical value colors of color images on printed matters obtained by printing mechanisms associated with the color profiles stored in said storage section, in accordance with the color profiles stored in said storage section; and a color profile retrieval section responsive to a predetermined instruction for executing a retrieval for a color file using the characteristic amount computed by said characteristic amount computing section as a retrieval key on the color profiles stored in said storage section and providing a result of the retrieval.

In the second profile server according to the present invention as mentioned above, it is characterized in that said color profile retrieval section receives the predetermined instruction via a communication network and provide a result of the retrieval via the communication network to an instruction source which issued the predetermined instruction.

In the event that there exists a number of printing sites, it is very troublesome that characteristics of colors of color images in such a number of printing sites are confirmed in accordance with a number of color profiles associated with the printing mechanisms provided on such a number of printing sites, respectively, and thus it is substantially difficult to seek and select a preferable printing site from among such a number of printing sites.

According to the profile retrieval apparatus and the second profile server of the present invention, even in the event that there exists a number of printing sites, it is possible to narrow candidates of the printing site down through a retrieval of color profiles according to characteristics of a color of a color image and thereby readily seeking and selecting a desired printing site.

DETAILED DESCRIPTION OF PREFERRED EMBODIMENTS

Embodiments of the present invention will be described with reference to the accompanying drawings.

Figure 1:
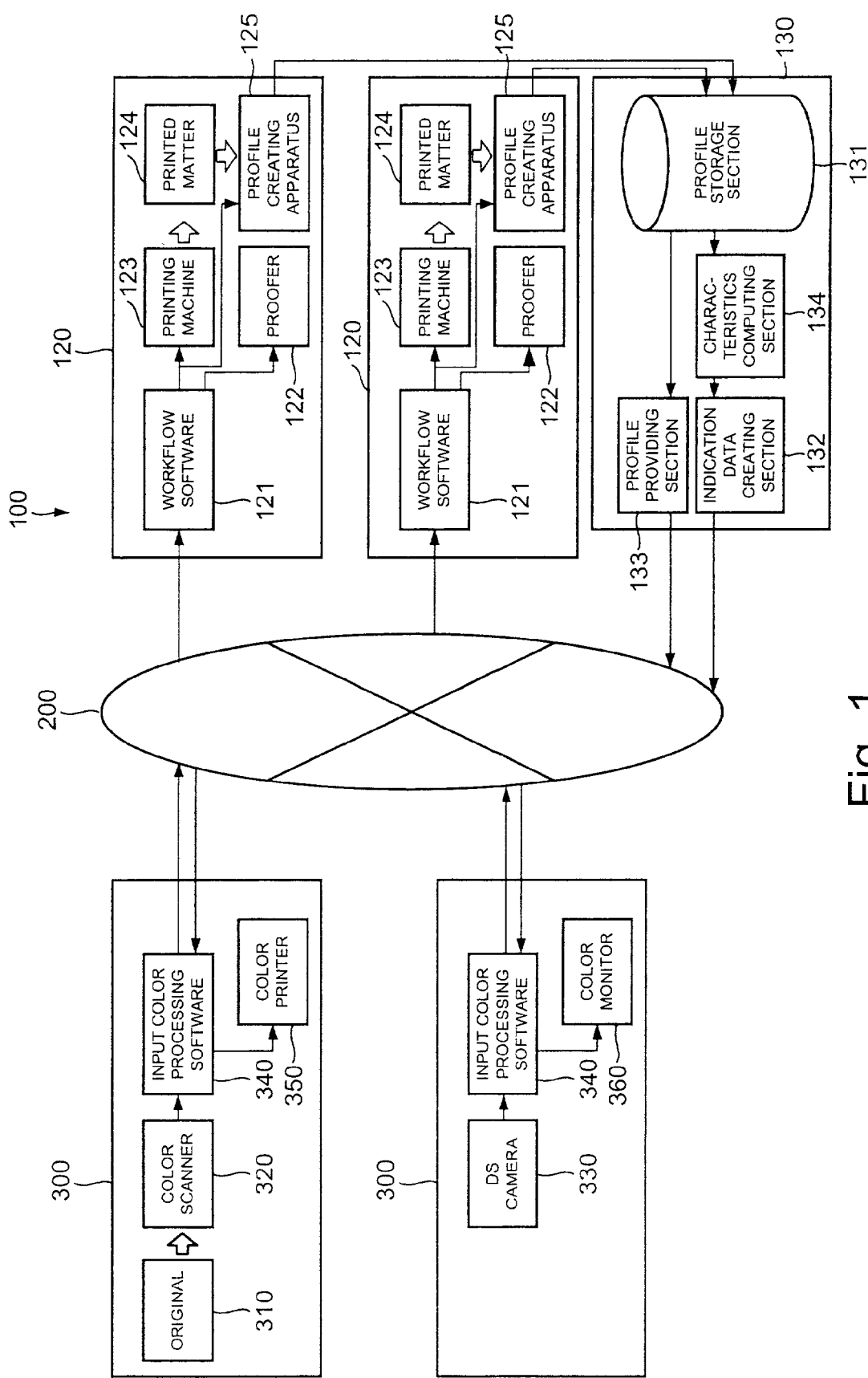
FIG. 1 is a view of a printing system incorporating thereinto an embodiment of a profile server of the present invention.

FIG. 1 is a view of a printing system incorporating thereinto an embodiment of a profile server of the present invention.

In a printing system 100, a plurality of printing companies and printing offices join in form of a printing site 120. The design companies and the publishers as a request source 300 request of the printing site 120 creation of a printed matter. Thus, image data is transferred via an Internet 200, which is an example of a communication network, between the printing site 120 and the request source 300.

FIG. 1 exemplarily shows two printing sites 120 constituting the printing system 100. FIG. 1 also shows a profile server 130 corresponding to a first embodiment of a profile server of the present invention. FIG. 1 further exemplarily shows two request sources 300 each requesting of the printing site 120 of the printing system 100 creation of a printed matter via the Internet 200.

The printing site 120 receives image data from the request source via the Internet 200 and creates a printed matter on which an image represented by the image data is printed. The printing site 120 converts the received image data into image data for printing by a workflow software 121. At that time, the above-mentioned color profile is used to perform the data conversion. The image data obtained through the data conversion is fed to a proofer 122, which is a dedicated printer for reproducing a printed matter 124 obtained by a printing machine 123 beforehand with greater accuracy, so that a so-called proofing work is performed referring to a print created by the proofer 122. After the proofing work is terminated, a machine plate is created in accordance with the image data so that the printing machine 123 performs a printing. Thus, the printed matter 124 is obtained.

The printing site 120 is provided with a profile creating apparatus 125. The profile creating apparatus 125 creates a color profile for the printing site 120. Incidentally, in the event that a plurality of printing mechanisms referred to in the present invention exist in one printing site 120, a color profile is created on each printing mechanism. For the sake of convenience, however, hereinafter, the explanation will be continued on the assumption that one printing site 120 is provided with one printing mechanism.

As the procedure of creation of the color profile, first, the printing machine 123 prints a color chart constituted of a large number of color patches. As image data representative of the color chart, there is used a series of CMYK data in which a series of values of dot %, wherein 0% to 100% is divided at even intervals, is applied to each of C, M, Y and K. Here, by way of example, it is assumed that there is used 6×4 pieces of CMYK data in which 6 pieces of dot % values, such as 0%, 20%, 40%, 60%, 80% and 100%, are applied to each of C, M, Y and K. Next, a calorimetric meter is used to measure colors of color patches constituting the color chart printed by the printing machine 123 so as to obtain chromaticity values (CIELAB values). And sets of a series of image data representative of the color chart and chromaticity values of the color patches are fed to the profile creating apparatus 125. The profile creating apparatus 125 creates in form of an LUT format a color profile representative of an association between the image data and the chromaticity values.

The profile server 130 shown in FIG. 1 stores a plurality of color profiles, which are created in a plurality of printing sites 120, respectively, and provides the color profiles via the Internet 200.

The profile server 130 is provided with a profile storage section 131, which is an example of the storage section and the storage medium referred to in the present invention. The profile storage section 131 stores a plurality of color profiles created by a plurality of profile creating apparatus 125 of a plurality of printing sites 120.

The profile server 130 is further provided with a characteristics computing section 134 which is an example of the characteristics amount computing section referred to in the present invention. The characteristics computing section 134 computes characteristics amount, which represents with a numerical value characteristics of a color of a color image in the printed matter obtained by the printing site 120 associated with a color profile, in accordance with the color profile stored in the profile storage section 131. Details of the way of computation will be described later.

The profile server 130 is furthermore provided with a display data creating section 132 which is an example of the characteristics amount indication data creating section referred to in the present invention. The display data creating section 132 creates characteristics amount indication data representative of characteristics computed by the characteristics computing section 134 and provides the same via the Internet 200. The display data creating section 132 serves also as an example of the color profile retrieval section referred to in the present invention, according to the present embodiment, and performs a retrieval for a color profile stored in the profile storage section 131. The display data creating section 132 and the characteristics computing section 134 constitute an example of the profile retrieval apparatus of the present invention.

The profile server 130 is still further provided with a profile providing section 133 which is an example of the profile providing section referred to in the present invention. The profile providing section 133 obtains a color profile stored in the profile storage section 131 and provides the color profile via the Internet 200.

As mentioned above, the request source 300 requests of the printing site 120 a printing. The request source 300 uses image data obtained through reading an image of an original 310 by a color scanner 320 or image data obtained by a digital still camera 330 to perform editing of a color image requested in printing. The color image is subjected to the color processing by an input color processing software 340 so as to be adjusted to a desired color of color image. A color printer 350 and a color monitor 360 confirm the color of the color image after the adjustment. Image data, in which the color of the color image has been confirmed, is sent to the printing site 120 so that the printing matter 124 is created, after readjustment as a need arises.

In confirmation of colors of color images and set up of reading conditions for reading an original by a scanner, it is desired to use a color profile of the printing site 120 requesting the printing. The color profile is provided from the profile server 130 via the Internet 200 to the request source 300. When the color profile is provided, it is necessary that the request source 300 selects the printing site 120. Prior to selection of the printing site, the request source 300 designates via the Internet 200 color profiles associated with printing sites more than one as the selection candidate for the characteristics computing section 134 of the profile server 130. The characteristics computing section 134 computes a characteristics amount representative of characteristics of a color of a color image on each of the printing sites as selection candidates with a numerical value in accordance with the designated color profile. The display data creating section 132 creates characteristics amount indication data representative of the characteristics amount computed by the characteristics computing section 134 and provides the same to the request source 300. The request source 300 refers to the characteristics amount represented by the characteristics amount indication data and thereby selecting the printing site 120 on the printing system 100. The profile providing section 133 of the profile server 130 is requested to provide the color profile of the printing site thus selected, so that the profile server 130 provides the selected color profile.

According to the first embodiment of the present invention, the characteristics amount indication data indicates characteristics amount on a list format basis. Table 1 shows an example of an indication format of the characteristics amount indicated by the characteristics amount indication data.

TABLE 1

| Names | Companies | Inks | Sheets | Printing machines | Solid density | 50% dot gain | Gray chromaticity values | Skin color chromaticity values |
|---|---|---|---|---|---|---|---|---|
| A1.prf | A print | T company | Art paper | K company | K1.B3 | K65% | L 45.3 | L 52.3 |
|  |  |  |  |  | C1.48 | C64% | A −1.3 | A 25.4 |
|  |  |  |  |  | M1.43 | M65% | B 2.2 | B 38.3 |
|  |  |  |  |  | Y1.16 | Y66% |  |  |
| B1.prf | B print | D company | Art paper | H company | K1.72 | K61% | L 48.3 | L 53.3 |
|  |  |  |  |  | C1.38 | C62% | A −2.4 | A 27.4 |
|  |  |  |  |  | M1.33 | M60% | B 0.3 | B 39.5 |
|  |  |  |  |  | Y1.04 | Y61% |  |  |

A name column of Table 1 indicates names of the color profiles designated by the request source 300. Here, "A1.prf" and "B1.prf" are shown by way of example. A company name column of Table 1 indicates names of printing companies each managing the printing site associated with the designated color profile. An ink column, a sheet column, a printing machine column, a solid density column and 50% dot gain column of Table 1 indicate maker names of inks to be used for printing, sorts of sheets to be used for printing, maker names of printing machines to be used for printing, actual measurements of density in solid printing for each of CMYK, and actual areal ratios in 50% halftone dot for each of CMYK, respectively. Information indicated in those solid density column and the like is information which is entered and stored when the profile is created, and such information is different from characteristics amount referred to in the present invention. Further, a gray chromaticity value column and a skin color chromaticity value column of Table 1 indicate, as the characteristic amount referred to in the present invention, chromaticity values (CIELAB values) representative of colors on the printed matter for image data ideally representative of gray and skin color. Those chromaticity values are computed from the color profile.

As mentioned above, the color profile is an LUT representative of an association between image data and chromaticity values (CIELAB values) representative of colors of the color image on the printed matter. Accordingly, the use of the color profile makes it possible to easily compute a color of a color image associated with image data representative of gray having a predetermined ideal gray balance (for example, C=50%, M=40%, Y=40%, K=0%), image data representative of dot % (for example, C =10%, M=45%, Y=40%, K=0%) of a balance corresponding to an ideal skin color, and a chromaticity value associated with image data ideally representative of pure primary color, in the manner as will be described below.

The color profile used here is, as mentioned above, an LUT which is created in accordance with 6×4 pieces of CMYK data in which 6 pieces of dot % values, such as 0%, 20%, 40%, 60%, 80% and 100%, are applied to each of C, M, Y and K. For example, chromaticity values L (50, 40, 40, 0), a (50, 40, 40, 0), and b (50, 40, 40, 0), which are associated with dot % of a balance such as C=50%, M=40%, Y=40% and K=0%, are computed based on the LUT in accordance with an interpolation such as a volume interpolation as follows:

$$L(50, 40, 40, 0) = 0.5 \times L(60, 40, 40, 0) +$$
$$0.5 \times L(40, 40, 40, 0)$$
$$a(50, 40, 40, 0) = 0.5 \times a(60, 40, 40, 0) +$$
$$0.5 \times a(40, 40, 40, 0)$$

Chromaticity values associated with image data of the special values as exemplarily shown in the above indicate such characteristics that for example, "gray is slightly biased to red", in the color image obtained by the printing site associated with the color profile. For this reason, a selector, who selects a printing site, can determine whether the printing site is able to obtain a preferable color image, referring to the chromaticity value. Incidentally, the indication of the characteristics amount in a list format as mentioned above is convenient for a person who refers to the list in the event that characteristics of colors is expressed by a number of items of numerical values, since the person can grasp a number of items in its entirety.

According to the first embodiment of the present invention, other than the indication format as shown in Table 1, there are adopted, as will be described later, various types of indication formats which are considered in order to enhance the utilization value as reference information when the printing site is selected.

Table 2 shows an indication format in which a comparison result of characteristic amounts in a plurality of printing sites is indicated.

TABLE 2

| Names | Companies | Inks | Sheets | Printing machines | Solid density | 50% dot gain | Gray chromaticity values | Skin color chromaticity values | All color average color difference |
|---|---|---|---|---|---|---|---|---|---|
| A1.prt | A print | T company | Art paper | K company | K1.83 | K65% | L 45.3 | L 52.3 | |
| | | | | | C1.48 | C64% | A −3.3 | A 25.4 | |
| | | | | | M1.43 | M65% | B 2.2 | B 38.3 | |
| | | | | | Y1.18 | Y66% | | | |
| B1.prf | B print | D company | Mat paper | H company | K1.72 | K61% | L 48.3 | L 53.3 | |
| | | | | | C1.38 | C62% | A −2.4 | A 27.4 | |
| | | | | | M1.33 | M60% | B 0.3 | B 37.5 | |
| | | | | | Y1.04 | Y61% | | | |
| A1/B1 diff. | (A1/B1) | | | | | | | | |
| | | x | x | x | ΔK0.11 | ΔK4% | ΔL −3.0 | ΔL −1.0 | |
| | | | | | ΔC0.10 | ΔC2% | ΔA −0.9 | ΔA −3.4 | |
| | | | | | ΔM0.10 | ΔM5% | ΔB 1.9 | ΔB 0.8 | |
| | | | | | ΔY0.12 | ΔY5% | ΔE 3.7 | ΔE 3.6 | ΔE(av)2.8 |

Table 2 indicates, similar to Table 1, chromaticity values (CIELAB values) as characteristics of the color images in the printing sites associated with two color profiles such as "A1.prf" and "B1.prf", respectively. Further, Table 2 indicates, as a result of comparison of characteristics of those two color profiles, differences ΔL, ΔA, ΔB of values of L, A, B, and a color difference ΔE obtained in form of the square of the square sum of those differences. A all color average color difference column of Table 2 indicates the value ΔE (av) in which color differences ΔE on all of 6×4 pieces of CMYK data representative of the association with the chromaticity values in the color profile are averaged.

Incidentally, here, there is also indicated a comparison result as to information other than characteristics amount referred to in the present invention. Information expressed by a character string, such as a maker name and a sort of sheets, is indicated with a mark indicating whether it is the same, in form of a result of comparison. Information expressed by a numerical value, such as a solid density, is indicated with a difference in the numerical value, in form of a result of comparison.

Table 3 indicates a display format in which there is indicated a result of comparison of a characteristics amount representative of characteristics of a color of a predetermined standard color image, which is the base for selecting a printing site, with a characteristics amount representative of characteristics of a color of a color image in the printing system designated as the candidate.

TABLE 3

| Names | Companies | Inks | Sheets | Printing machines | Solid density | 50% dot gain | Gray chromaticity values | Skin color chromaticity values | All color average color difference | Overall rank |
|---|---|---|---|---|---|---|---|---|---|---|
| ST.prf | ST print | T company | Art paper | K company | K1.83<br>C1.48<br>M1.43<br>Y1.16 | K65%<br>C64%<br>M65%<br>Y66% | L 45.3<br>A −3.3<br>B 2.2 | L 52.3<br>A 25.4<br>B 38.3 | | |
| B2.prf | B print | D company X | Coat paper X | M company X | ΔK...<br>ΔC...<br>ΔM...<br>ΔY... | ΔK...%<br>ΔC...%<br>ΔM...%<br>ΔY...% | ΔL...<br>ΔA...<br>ΔB...<br>ΔE... | ΔL...<br>ΔA...<br>ΔB...<br>ΔE... | ΔE(av)4.9 | D rank |

The upper stages of Table 3 exemplarily show characteristics amounts representative of characteristics of colors of a predetermined standard color image. As the standard color image, there is adopted, for example, an ideal color image that is deemed to be empirically preferable in the printing trade. Here, as the standard color image, there is adopted a color image that is obtained on the base of a standard color profile referred to as "St. prf" that is deemed to be empirically preferable in the printing trade. The characteristic amount representative of characteristics of a color of the color image is computed by the characteristics computing section in accordance with the standard color profile.

The lower stages of Table 3 indicate a result of comparison of a characteristic amount representative of characteristics of a color of the color image obtained by the printing site associated with the color profile addressed as "B2. Prf" with a characteristic amount representative of characteristics of a color of the standard color image. According to the indication format of Table 3, a comparison result similar to Table 2 is indicated and a rank determined on the basis of a predetermined decision criterion is indicated in the "overall rank" column. Here, the value ΔE (av) of all color average color difference is used for a decision. The rank is established, for example, in such a manner that when the value ΔE (av) is not above than 2.0, A rank is established; when the value ΔE (av) exceeds 2.0 but is not above than 3.0, B rank is established; when the value ΔE (av) exceeds 3.0 but is not above than 4.0, C rank is established; and when the value ΔE (av) exceeds 4.0, D rank is established. According to the example shown in Table 3, the value ΔE (av) of all color average color difference is 4.9, then "D rank" is established as a decision result.

A selector, who selects the printing site, can select a preferable printing site referring to the comparison result thus indicated, even if the selector does not know characteristics of a color of a color image, which is a criterion for selection of a preferable printing site.

According to the first embodiment of the present invention, the display data creating section 132 shown in FIG. 1 incorporates thereinto also a function as the color profile retrieval function referred to in the present invention. When the request source 300 designates for the display data creating section 132 a color profile of a preferable printing site of interest, the display data creating section 132 causes the characteristics computing section 134 to compute characteristics of a color of a color image in accordance with the color profiles stored in the profile storage section 131 so as to retrieve a color profile near the designated color profile in characteristics. A result of retrieval is incorporated into the characteristic amount indication data and then provided for the request source 300.

Table 4 shows an indication format by characteristic amount indication data into which a result of retrieval is incorporated.

TABLE 4

| Order | Names | Companies | Inks | Sheets | Printing machines | Solid density | 50% dot gain | Gray chromaticity values | Skin color chromaticity values | All color average color diffemece |
|---|---|---|---|---|---|---|---|---|---|---|
| Target | A1.prf | A print | T company | Art paper | K company | K1.83<br>C1.48<br>M1.43<br>Y1.16 | K65%<br>C64%<br>M65%<br>Y66% | L 45.3<br>A −3.3<br>B 2.2 | L 52.3<br>A 25.4<br>B 38.3 | |
| (1) | Q3.prf | Q print | D company X | Coat paper X | M company X | ΔK...<br>ΔC...<br>ΔM...<br>ΔY... | ΔK...%<br>ΔC...%<br>ΔM...%<br>ΔY...% | ΔL...<br>ΔA<br>ΔB...<br>ΔE... | ΔL...<br>ΔA...<br>ΔB...<br>ΔE... | ΔE(av)2.3 |
| (2) | F1.prf | F print | D company X | Art paper ○ | H company X | ΔK...<br>ΔC...<br>ΔM...<br>ΔY... | ΔK...%<br>ΔC...%<br>ΔM...%<br>ΔY...% | ΔL...<br>ΔA...<br>ΔB...<br>ΔE... | ΔL...<br>ΔA...<br>ΔB...<br>ΔE... | ΔE(av)2.9 |
| (3) | S2.prf | S print | T company ○ | Art paper ○ | K company ○ | ΔK...<br>ΔC...<br>ΔM...<br>ΔY... | ΔK...%<br>ΔC...%<br>ΔM...%<br>ΔY...% | ΔL...<br>ΔA...<br>ΔB...<br>ΔE... | ΔL...<br>ΔA...<br>ΔB...<br>ΔE... | ΔE(av)3.3 |

Here, there is executed a retrieval wherein the value ΔE (av) of the all color average color difference is used as a retrieval key, so that the color profiles are sorted in order of the smaller value ΔE (av) of the all color average color difference wherein the designated color profile is established as a standard. The color profiles retrieved and sorted are indicated together with the result of comparison shown in Table 3.

In Table 4, the color profile addressed as "A1. Prf" as the designated color profile is exemplarily shown in the stage of "Target", and as the retrieved color profile, three color profiles addressed as "Q3. Prf", "F1. Prf" and "S2. Prf" are exemplarily shown. Of those three color profiles, the color profile addressed as "Q3. Prf" is smallest in the value ΔE (av) of the all color average color difference. For this reason, it is expected that the printed matter, which is obtained by the printing site associated with the color profile addressed as "Q3. Prf", is a preferable printed matter in a similar fashion to that obtained by the printing site associated with the color profile addressed as "A1. Prf" shown in the stage of "Target".

When such a result of retrieval is provided, the selector, who selects a printing site, readily narrows the candidates of the printing site referring to the result of retrieval, even if there are a number of printing sites on the printing system, and is able to select a preferable printing site.

With the above description, the explanation of the first embodiment of the present invention is terminated. According to the first embodiment of the present invention, the computed characteristics amount is indicated in a table format. However, according to the present invention, it is acceptable that the computed characteristics amount is indicated in a graph format as in the various embodiments as will be described below.

The various embodiments, as will be described below, are the same as the above-mentioned first embodiment of the present invention, excepting that the indication format for the computed characteristics amount is different from the first embodiment of the present invention. Thus, redundant description will be omitted.

Figure 2:
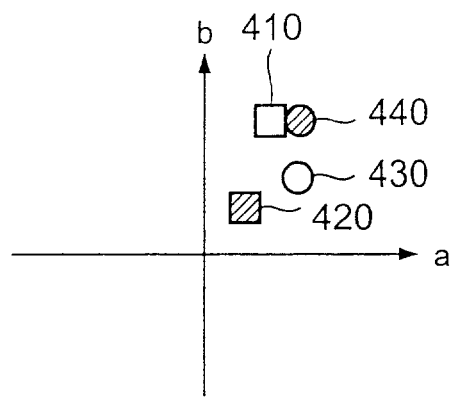
FIG. 2 is a graph showing chromaticity values of colors of a color image in a second embodiment of the present invention.
Figure 3:
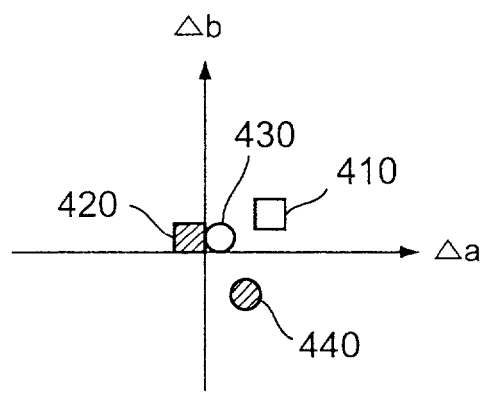
FIG. 3 is a graph showing differences between the chromaticity values of colors of the color image in the second embodiment of the present invention.

FIG. 2 and FIG. 3 show graphs indicating characteristics amount in the second embodiment of the present invention. FIG. 2 is a graph showing chromaticity values of colors of a color image in the second embodiment of the present invention. FIG. 3 is a graph showing differences between the chromaticity values of colors of the color image in the second embodiment of the present invention.

According to the second embodiment of the present invention, there is created and provided characteristics amount indication data in which the computed characteristics amount is indicated in form of a two-dimensional graph.

In FIG. 2, the horizontal axis of the graph denotes values "a" of CIELAB values, and the vertical axis of the graph denotes values "b" of CIELAB values. In FIG. 3, the horizontal axis of the graph denotes a difference between the values "a" of CIELAB values, and the vertical axis of the graph denotes a difference between values "b" of CIELAB values. In those graphs, characteristic amounts, which are computed in accordance with a certain profile, are expressed on a-b plane and Δa-Δb plane with square marks 410 and 420, and characteristic amounts, which are computed in accordance with another profile, are expressed on the a-b plane and the Δa-Δb plane with circle marks 430 and 440. Of those marks 410, 420, 430 and 440, the marks 410 and 430, which are outline marks on a colored background, represent chromaticity values of a skin color on a color image to image data representative of dot % balance corresponding to an ideal skin color, and the marks 420 and 440, which are hatched, represent chromaticity values of a gray on a color image to image data representative of dot % of an ideal gray balance.

Thus, when the characteristic amount computed in accordance with the profile is indicated in form of a two-dimension graph, a person, who refers to the graph, is able to sensuously grasp characteristics of a color of a color image and thus convenience.

Figure 4:
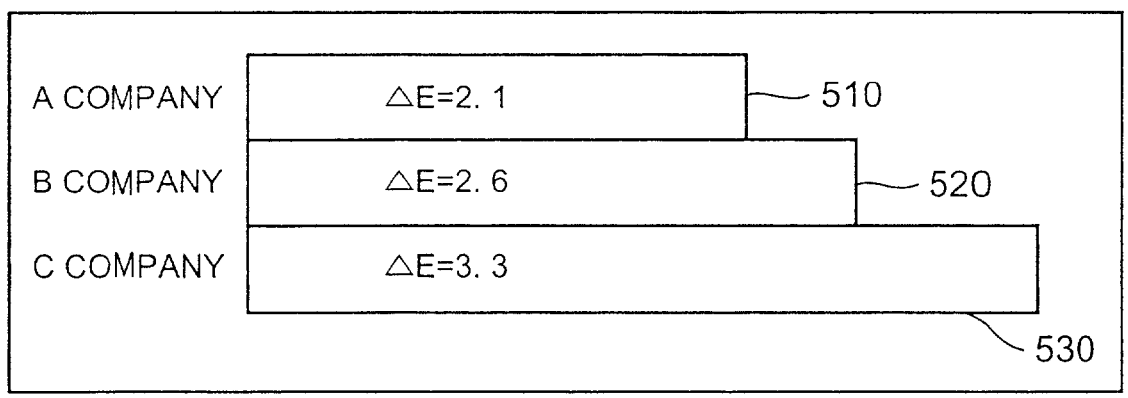
FIG. 4 is a graph showing characteristics amount in a third embodiment of the present invention.

FIG. 4 is a graph showing characteristics amount in a third embodiment of the present invention.

According to the third embodiment of the present invention, there is created and provided characteristics amount indication data in which the computed characteristics amount is indicated in form of a bar graph.

Length of bars 510, 520 and 530 in the bar graph shown in FIG. 4 denotes the value of the above-mentioned color difference ΔE, and the bars 510, 520 and 530 are associated with the printing sites.

When the characteristic amount is indicated with the bar graph, a person, who refers to the bar graph, is able to quantitatively grasp characteristics of a color of a color image and thus convenience.

Incidentally, according to the embodiments of the present invention, as mentioned above, the indication data creating section creates and provides data in which a result of retrieval of a color profile is indicated together with characteristic amount representative of characteristics of a color of a color image. It is acceptable, however, that a profile server and a profile retrieval apparatus, which have a color profile retrieving section referred to in the present invention, provides only a result of retrieval omitting the characteristic amount. Further, according to the embodiments of the present invention, as mentioned above, the indication data creating section retrieves a color profile using a predetermined portion of the characteristic amount representative of a color of a color image. It is acceptable, however, that the color profile retrieving section referred to in the present invention is one in which a portion to be used for a retrieval key is designated and the designated portion is used as the retrieval key.

As mentioned above, according to a profile server and a profile retrieval apparatus of the present invention, it is possible to provide information to select a printing site.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A profile server comprising:
   a storage section for storing on each of a plurality of printing mechanisms a color profile representative of an association between a color of a color image on a printed matter obtained by a printing mechanism for printing the color image in accordance with image data representative of the color image and the image data;
   a color profile providing section for obtaining the color profile from said storage section when the color profile is required, and providing the obtained color profile;
   a characteristic amount computing section for computing characteristic amount representing with a numerical value colors of color images on printed matters obtained by printing mechanisms associated with color profiles designated more than one from among a plurality of color profiles stored in said storage section, in accordance with the designated color profiles more than one; and a characteristic amount indication data creating section for creating characteristic amount indication data indicating the characteristic amount computed by said characteristic amount computing section and providing the created characteristic amount indication data.

2. A profile server according to claim 1, wherein said characteristic amount computing section designates the color profiles more than one via a communication network, and said characteristic amount indication data creating section provides the characteristic amount indication data to a designation source that designates the color profiles more than one for said characteristic amount computing section.

3. A profile server according to claim 1, wherein said characteristic amount indication data creating section compares mutually characteristic amounts with one another computed on a plurality of color profiles and creates data indicating a result of comparison in form of the characteristic amount indication data.

4. A profile server according to claim 1, wherein said characteristic amount indication data creating section compares the characteristic amount computed by said characteristic amount computing section with characteristic amount representative characteristics of a color of a predetermined standard color image and creates data indicating a result of comparison in form of the characteristic amount indication data.

5. A profile server according to claim 1, wherein said characteristic amount indication data creating section creates data wherein the characteristic amount computed by said characteristic amount computing section is indicated in a table format, in form of the characteristic amount indication data.

6. A profile server according to claim 1, wherein said characteristic amount indication data creating section creates data wherein the characteristic amount computed by said characteristic amount computing section is indicated in a graph format, in form of the characteristic amount indication data.

7. A profile retrieval apparatus comprising:

a characteristic amount computing section for computing characteristic amount representing with a numerical value colors of color images on printed matters obtained by printing mechanisms associated with color profiles each representative of an association between a color of a color image on a printed matter obtained by a printing mechanism for printing the color image in accordance with image data representative of the color image and the image data, in accordance with the color profiles stored in a storage medium storing the color profiles on a plurality of printing mechanism; and a color profile retrieval section responsive to a predetermined instruction for executing a retrieval for a color file using the characteristic amount computed by said characteristic amount computing section as a retrieval key on the color profiles stored in said storage medium.

8. A profile server comprising:

a storage section for storing on each of a plurality of printing mechanisms a color profile representative of an association between a color of a color image on a printed matter obtained by a printing mechanism for printing the color image in accordance with image data representative of the color image and the image data;

a color profile providing section for obtaining the color profile from said storage section when the color profile is required, and providing the obtained color profile;

a characteristic amount computing section for computing characteristic amount representing with a numerical value colors of color images on printed matters obtained by printing mechanisms associated with the color profiles stored in said storage section, in accordance with the color profiles stored in said storage section; and a color profile retrieval section responsive to a predetermined instruction for executing a retrieval for a color file using the characteristic amount computed by said characteristic amount computing section as a retrieval key on the color profiles stored in said storage section and providing a result of the retrieval.

9. A profile server according to claim 8, wherein said color profile retrieval section receives the predetermined instruction via a communication network and provide a result of the retrieval via the communication network to an instruction source which issued the predetermined instruction.

* * * * *